No. 612,727. Patented Oct. 18, 1898.
C. F. HAWKINS.
BAND CUTTER AND FEEDER.
(Application filed Feb. 28, 1898.)
(No Model.) 3 Sheets—Sheet 1.
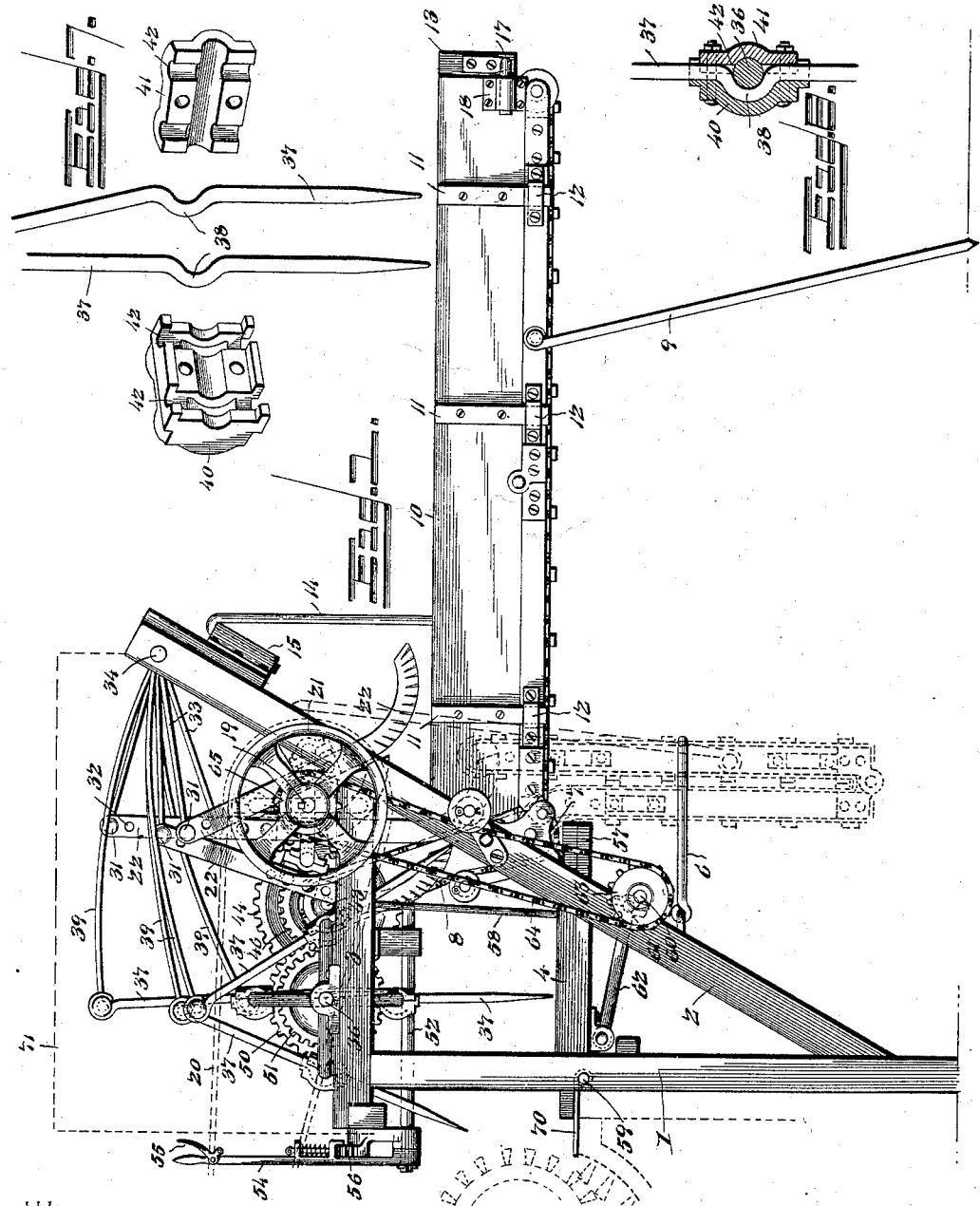
Witnesses
E. F. Stewart.
V. B. Hillyard.
Charles F. Hawkins, Inventor
By his Attorneys.
C. A. Snow & Co.

No. 612,727. Patented Oct. 18, 1898.
C. F. HAWKINS.
BAND CUTTER AND FEEDER.
(Application filed Feb. 28, 1898.)
(No Model.) 3 Sheets—Sheet 2.
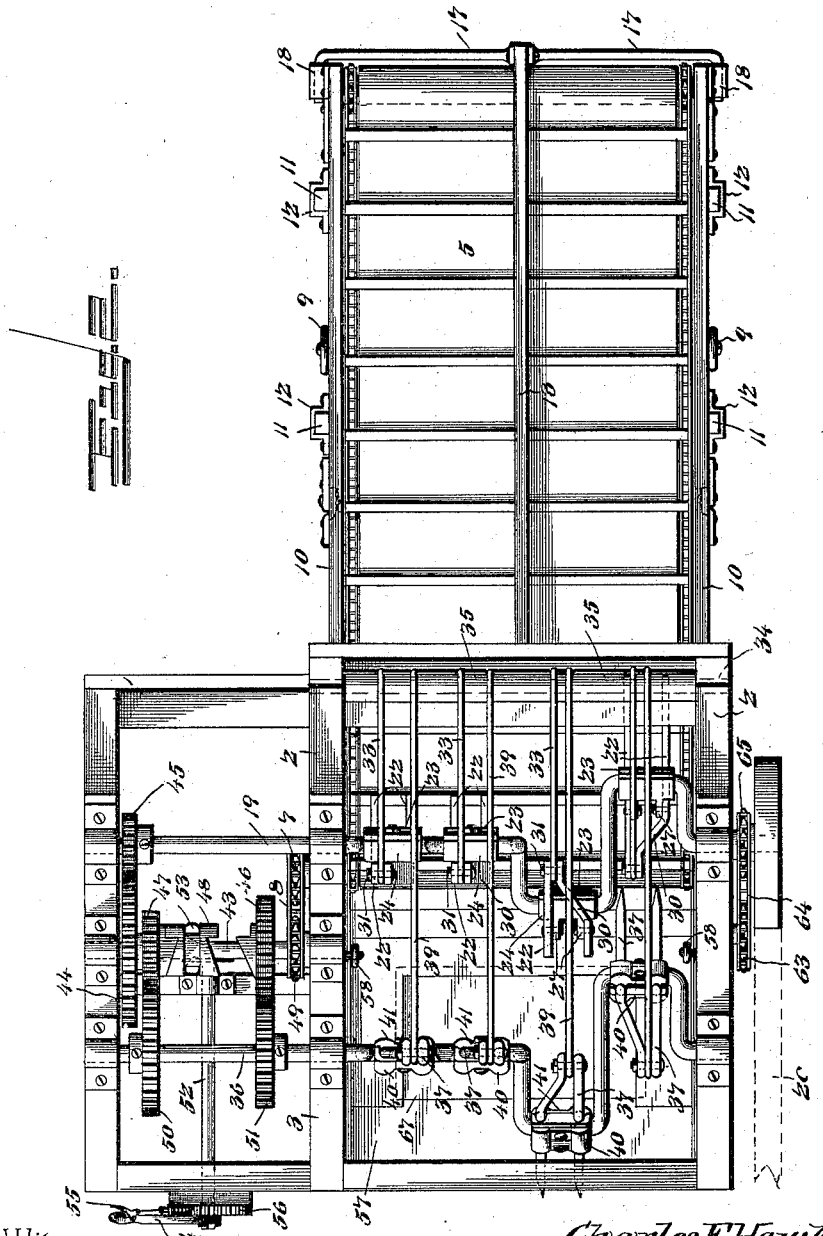
Witnesses
E. K. Stewart
V. B. Hillyard
Charles F. Hawkins, Inventor
By his Attorneys,
C. A. Snow & Co.

No. 612,727. Patented Oct. 18, 1898.
C. F. HAWKINS.
BAND CUTTER AND FEEDER.
(Application filed Feb. 28, 1898.)
(No Model.) 3 Sheets—Sheet 3.
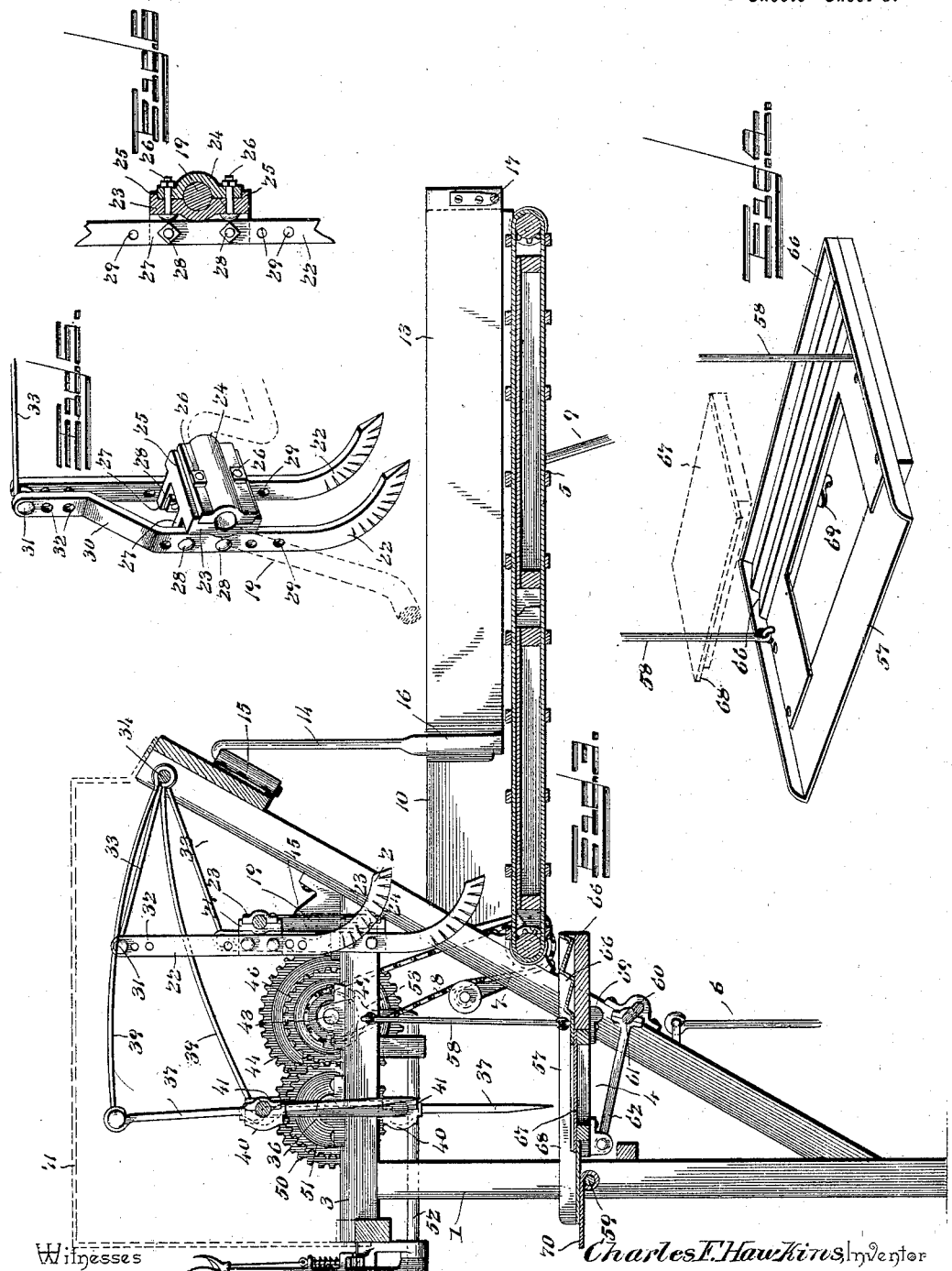

UNITED STATES PATENT OFFICE.

CHARLES F. HAWKINS, OF ST. JOHN, KANSAS.

BAND-CUTTER AND FEEDER.

SPECIFICATION forming part of Letters Patent No. 612,727, dated October 18, 1898.

Application filed February 28, 1898. Serial No. 672,022. (No model.)

*To all whom it may concern:*

Be it known that I, CHARLES F. HAWKINS, a citizen of the United States, residing at St. John, in the county of Stafford and State of Kansas, have invented a new and useful Band-Cutter and Feeder, of which the following is a specification.

This invention has relation to that class of mechanisms for automatically feeding grain to the threshing mechanism of a separator and at the same time severing the bands by means of which the grain is bound in bundles or gavels.

The purpose of the invention is to improve this class of machines, and particularly the mechanism whereby the bands are cut and the grain loosened, lightened, and separated, these parts being adjustable according to the quantity of grain fed to the thresher in a given time, so as to obviate choking and the necessity for stopping the separator for the purpose of clearing the threshing mechanism and removing obstructing matter.

A further purpose of the invention is to dispose the operating parts so that the major part of the weight is thrown upon the separator, thereby enabling the attachment to be applied to the separator, so as to be movable therewith from one place to another. The carrier upon which the bound bundles of grain are thrown and which advances them to the cutting and spreading mechanisms is constructed so as to fold against the framework of the attachment, so as to reduce the length of the attachment and throw the weight as near the separator as possible.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a band-cutter and feeder constructed in accordance with this invention, the dotted lines representing the carrier in a folded position. Fig. 2 is a top plan view. Fig. 3 is a central longitudinal section. Fig. 4 is a detail view of the grain-pan, the center portion being removed and shown elevated by dotted lines. Fig. 5 is a detail view in perspective of a pair of knives and the hanger therefor. Fig. 6 is a detail section of said hanger. Fig. 7 is a detail view of a fork and the bearing therefor, the parts being separated and disposed in a group. Fig. 8 is a detail section of a fork-bearing.

Corresponding and like parts are referred to in the following description and indicated in the views of the drawings by the same reference characters.

The framework for supporting the operating parts comprises upright posts 1, inclined beams 2, upper longitudinal bars 3, lower longitudinal bars 4, and transverse bars connecting the parts comprising the side frames. The carrier 5 is of ordinary construction, comprising a frame and an endless belt or apron, the latter passing around rollers at the extremities of the frame. The carrier is adapted to fold about midway of its ends and has a pivotal or hinge connection with the inclined beams 2. The inner section of the carrier folds downward, and the outer section folds upward and against the inner section, as clearly indicated in Fig. 1, the sections being held in a folded position by means of a hook or catch 6. The journal of the inner or upper roller on the carrier is extended and is provided with a spur-wheel 7, around which passes a drive-chain 8, by means of which motion is transmitted to the said inner or upper roller and from it to the endless apron of the carrier. The carrier is supported at its outer end by legs 9, which have pivotal connection therewith at their upper ends and which are adapted to fold with the carrier when reducing the size of the attachment.

In order to retain the grain upon the carrier, side boards or pieces 10 are fitted to the longitudinal frame-bars thereof, the connections being secured by means of stakes 11, secured to the outer faces of the boards 10 and having their lower ends fitted into keepers 12, applied to the longitudinal bars of the carrier 5. A center board 13 divides the carrier longitudinally, so as to form two passages, thereby preventing the grain from getting crosswise of the carrier and the bundles upon opposite edge portions thereof interfering with one another. A rod 14, provided with a hook at its upper end, makes detachable connection with a keeper 15, applied to a cross-bar of the framework, and has a loop 16 at its lower end, in which is received the front end of the center board 13, said end being reduced to provide shoulders at its sides to limit the forward movement of the board 13 when placing it in position. Other rods 17 have their end portions bent and are secured at their inner ends to the sides of the center board 13, at its rear end, and have their outer ends fitted into keepers 18, secured to the outer sides of the boards 10, near their lower rear corners. These rods 17 support the rear end of the center board 13 and by being disposed in the manner set forth are low down and out of the way and offer no obstruction to the grain when thrown upon the receiving end of the carrier.

A multiple crank-shaft 19 is journaled in bearings applied to the upper longitudinal bars 3 and its crank portions extend at different relative angles, whereby the cutters mounted thereon are variously located and in different stages of movement, whereby when some are in position to cut the bands others are advancing and some are returning to an active position. The initial movement or power is imparted to this multiple crank-shaft 19 from any suitable source of power or from a moving part of the separator by means of a belt 20, passing around a band-pulley 21, secured to an end of the shaft. The knives 22 are provided in pairs and the pairs are mounted upon the respective crank portions of the multiple crank-shaft 19 in a similar manner, so as to be adjusted vertically to adapt them to the size of the bundles of grain to be threshed. Inasmuch as the mountings are similar in construction a detailed description of one only will be given. Each mounting consists of complementary plates 23 and 24, which have their meeting faces transversely grooved, the grooves corresponding in position and unitedly forming a bearing for a crank portion of the shaft when the plates 23 and 24 are brought together. The plate 23 has its meeting face depressed, so as to provide upper and lower flanges 25, which embrace the upper and lower ends of the plate 24, so as to hold the latter in position and prevent any relative vertical movement of the plates 23 and 24 when brought together and secured. Bolts 26 connect the plates 23 and 24 above and below the grooved parts thereof. The plate 23 is formed with parallel ribs 27 upon its outer face, said ribs being spaced apart and having the knives of a pair of cutters adjustably connected therewith by bolts or fastenings 28. The knives have a series of openings 29 in their length, which are adapted to receive the bolts or fastenings 28, by means of which they are adjustably connected with their mountings. The lower ends of the knives are curved outwardly or toward the receiving end of the carrier, and their sharpened edges are serrated to enable them the better to cut the bands when passing thereover. The upper end of one of the knives of each pair is bent inward, as shown at 30, toward the corresponding end of the other knife, so as to reduce the space between them, and these ends are connected by a bolt or pin 31, which passes through one of a series of openings 32 in the upper ends of the knives, whereby the rods 33 may be adjustably connected with the pairs of knives to regulate their throw and to adapt the connections between the knives and rods 33 to the elevation of the cutters. A transverse rod 34 is supported at its ends in the upper portions of the beams 2, and is provided with a series of spacing-sleeves 35, and the rods 33 have their front ends loosely connected with the transverse rod, so as to turn freely thereon to allow the rods 33 to oscillate, so as to adapt themselves to the movements of the cutters 22.

A compound crank-shaft 36, arranged parallel with the multiple crank-shaft 19, is journaled in bearings applied to the longitudinal bars 3 of the frame, and its crank portions support the forks 37, by means of which the grain is loosened, lightened, and advanced to the threshing mechanism. The forks are shown as comprising a pair of tines, which are formed at an intermediate point with semicircular bends 38 to conform to the crank portions of the shaft 36. The upper ends of the tines converge and have pivotal connection with the inner ends of spring-rods 39, which have loose connection with the transverse rod 34 in a manner similar to the rods 33. The several rods 33 and 39 are held separated the proper distance by the spacing-sleeves 35, which are strung upon the part 34. The spring-rods 39 are bowed upwardly and are adapted to yield in the event of the active ends of the forks meeting with abnormal strain, such as would be occasioned by the forks entering a bunch of wet or damp grain. The bearings for the forks consist of corresponding boxes 40 and 41, which have corresponding grooves in their meeting faces to receive the crank portions of the shaft 36 when the boxes are brought together. Each box 40 has upper and lower flanges to extend over the corresponding ends of the box 41, whereby the two boxes when brought together are held in proper relation. These boxes are held together by suitable bolts passing through openings therein. The meeting faces of the boxes are formed with vertical grooves 42, which provide passages for the tines of the forks. The grooves 42 in one of the boxes, as 40, are deepened opposite the transverse groove, so as to receive the semicircular bends 38 of the forks. The crank portions of the crank-shaft 36 are arranged at different angles relative to one another, whereby the forks are caused to successively operate upon the grain and advance it to the separator.

A shaft 43 is located intermediate of the outer end portions of the crank-shafts 19 and 36, and is provided with a gear-wheel 44, meshing with a pinion 45, secured upon the crank-shaft 19, whereby motion is transmitted from the latter shaft to the shaft 43. Differential gear-wheels 46 and 47 are mounted loosely upon the shaft 43 and are spaced apart and have half-clutches on their inner or opposing faces. A collar or sleeve 48, provided at its ends with half-clutches to intermesh with the corresponding clutches of the gear-wheels 46 and 47, is slidably mounted upon the shaft 43, intermediate of the gear-wheels 46 and 47, and is keyed to the said shaft, so as to revolve therewith. This part 48, with its cog ends, constitutes a clutch and when moved to the limit of its throw in either direction makes clutched engagement with either of the gear-wheels 46 or 47, according to the direction of its throw, whereby either one of the said gear-wheels is caused to revolve with the shaft 43. The inner gear-wheel 47 has formed with or connected thereto a pinion 49, around which passes the drive-chain 8, thereby connecting the spur-wheel 7 and the pinion 49, whereby power is transmitted from the shaft 43 to the carrier in the manner aforesaid. A gear-wheel 50 is secured to the outer end of the crank-shaft 36 and is in mesh with the gear-wheel 46, and a second gear-wheel 51 is secured to the shaft 36 and meshes with the inner gear-wheel 47. These gear-wheels 50 and 51 are of different diameters corresponding to the difference in diameters of the gear-wheels 46 and 47. When the clutch 48 is in engagement with the gear-wheel 46, the forks and the endless apron of the carrier will be driven at a slower speed relative to the cutting mechanism than when the said clutch is brought into engagement with the gear-wheel 47. This difference of speed is due to the differential gearing 46 and 47 and the companion gear-wheels 50 and 51 in meshing relation therewith. Any suitable means may be employed for shifting the clutch 48, and, as shown, a shaft 52 is mounted in bearings applied to the framework and is located beneath the shafts 19, 36, and 43 and is provided at one end with a fork 53, which enters an annular groove of the part 48 and at its opposite end with a lever 54, having the usual hand-latch 55 to coöperate with a notched segment 56, whereby the clutch, when moved, is held in an adjusted position. When the clutch 48 is moved to an intermediate point between the gear-wheels 46 and 47, the forks, carrier, and grain-pan are thrown out of action.

The grain-pan 57 is located at the inner or delivery end of the carrier 5 and directly beneath the forks 37 and bridges the space between the delivery end of the carrier and the receiving end of the separator. This grain-pan is supported by means of links 58 and a transverse rod 59 and receives a vibratory movement, whereby the grain received thereon is gradually advanced to the separator. A shaft 60 is journaled in bearings applied to the beams 2 and is located beneath the grain-pan and is provided near its ends with crank portions 61, which are connected by links 62 with the delivery end of the grain-pan. A spur-wheel 63 is keyed to an end of the shaft 60 and a sprocket-chain 64 connects it with a corresponding spur-gear 65, secured to the multiple crank-shaft 19 adjacent to the band-pulley 21, whereby motion is transmitted from the shaft 19 to the shaft 60. The receiving end of the grain-pan or the end adjacent to the carrier 5 is formed with a series of transverse pockets 66, which receive the kernels or heads of grain separated from the straw and prevent the same being carried over the outer end of the grain-pan. These pockets are separated by transverse shoulders and gradually grow less in depth toward the delivery end of the grain-pan, so as to admit of the forward movement of the grain under the vibratory movements of the grain-pan. The middle portion of the grain-pan is open, so as to admit of access being readily had to the concave and cylinder of the threshing mechanism when it is required to inspect, clean, or repair the same. A plate 67 closes the opening of the grain-pan and is provided at one end with a projecting lip 68 to overlap an edge portion of the said opening, whereby the plate is supported at one end, and the opposite end of the plate is held in position by a turn-button or like device 69. The grain-pan 57 is constructed of sheet metal and is strenghtened and braced by a substructure secured thereto and inclosing the opening upon three sides. The plate 67 is likewise of sheet metal and is stiffened by a frame applied to its under side, and this frame fits snugly within the frame applied to the under side of the grain-pan, thereby holding the plate 67 from lateral displacement when in position. An apron 70 is pivotally supported upon the transverse rod 59, and its free end extends into and overlaps the upper edge portion of the concave of the threshing mechanism, thereby preventing the loss of any grain. This apron is a plate having an edge portion formed into a roll through which the transverse rod 59 is slipped.

When the attachment is fitted to the receiving end of a separator and the carrier is unfolded and supported in an operative position and the parts are set in motion, the bundles of grain tossed upon the carrier are advanced and the bands binding the same are severed by the cutting mechanism, and the forks coming in contact with the grain loosen, lighten, and feed it to the thresher. The loose grains, becoming detached from the straw and dropping from their pods, are received upon the grain-pan and delivered by the latter into the separator in the manner set forth. When the attachment is not required for further use, the outer section of the carrier is folded upon the inner section and the latter folded against the frame of the attachment and secured by the hooks or catches 6. The forks and cutting mechanism will be suitably incased in any desired manner, and, as shown, a housing 71 is fitted to the upper portion of the frame and incloses the parts referred to.

The endless belt or apron of the carrier may be canvas or like material reinforced at its edges by straps of leather, slats or bars being secured to the textile to engage with and feed the bundles forward.

Having thus described the invention, what is claimed, and desired to be secured by Letters Patent, is—

1. In a band-cutter and feeder, the combination of a shaft having a crank portion, and a two-part bearing-box, of a fork or like part clamped between the parts of the said bearing-box and having a crimped or deflected portion to clear the aforesaid crank portion and prevent relative movement of the fork and box, substantially in the manner set forth.

2. In a band-cutter and feeder, the combination with the carrier and the band-cutting mechanism, of a compound crank-shaft, forks having a crimp or bend 38, and separable bearing-boxes mounted upon crank portions of the crank-shaft and having corresponding vertical grooves 42 formed in the meeting faces of their complementary parts to receive the forks and the bends 38 thereof, substantially as set forth.

3. In a band-cutter and feeder, the combination with the shaft having a crank portion and a bearing-box mounted upon the said crank portion and formed with outwardly-extending ribs, of knives arranged at right angles to the shaft and placed against the sides of the said ribs, and means for adjustably and positively connecting the knives to the ribs, substantially as and for the purpose described.

4. In a band-cutter and feeder, the combination with the carrier and a shaft having crank portions, of plates having transverse grooves in their inner faces to receive the crank portions of the shaft, and provided at their edges with flanges parallel with the grooves, and having vertical ribs at their rear sides, companion plates secured to the flanged plates and fitting between the flanges thereof, and confining the crank portions of the crank-shaft in the grooves thereof, and knives secured to the vertical ribs, substantially as set forth.

5. In a band-cutter and feeder, the combination with the carrier and multiple crank-shaft, of mountings applied to the crank portions of the crank-shaft and having outwardly-extending ribs, pairs of knives having their lower ends curved and serrated and having their upper ends brought together to reduce the intervening space and extending parallel for a short distance, the parallel portions having a series of transversely-alined openings, means for adjustably connecting said knives with the ribs of the mountings, rods having one end inserted in the space formed between the upper ends of companion knives, and means for adjustably connecting said rods with the knives, substantially as and for the purpose set forth.

6. In a band-cutter and feeder, the combination of a folding carrier, side pieces having detachable connection with the frame of the carrier, a center board dividing the carrier longitudinally and having its inner end reduced and shouldered, a rod for supporting the inner end of the center board formed with a loop at its lower end to be removably fitted to the reduced end of the said board and having a hook at its upper end to make detachable connection with a keeper applied to the frame, rods secured to the rear end of the center board and having their end portions bent, and adapted to be detachably fitted to the said side boards, and keepers applied to the lower rear portions of the said side boards, and receiving the bent ends of the rods applied to the sides of the center board, substantially as set forth.

7. In a band-cutter and feeder, the combination with the carrier, cutting and feeding mechanisms, of a grain-pan located in the rear of the carrier and having its middle portion open so as to admit of access to the threshing mechanism, and a plate for closing the opening of the grain-pan, said plate being supported at one end by a lip portion overlapping an edge portion of the grain-pan, and held in place at its opposite end by supporting means, substantially as set forth.

In testimony that I claim the foregoing as my own I have hereto affixed my signature in the presence of two witnesses.

CHARLES F. HAWKINS.

Witnesses:
WILLIAM REYNOLDS,
WILLIAM D. ARMAN.